Figures 1, 2, 3, 4:
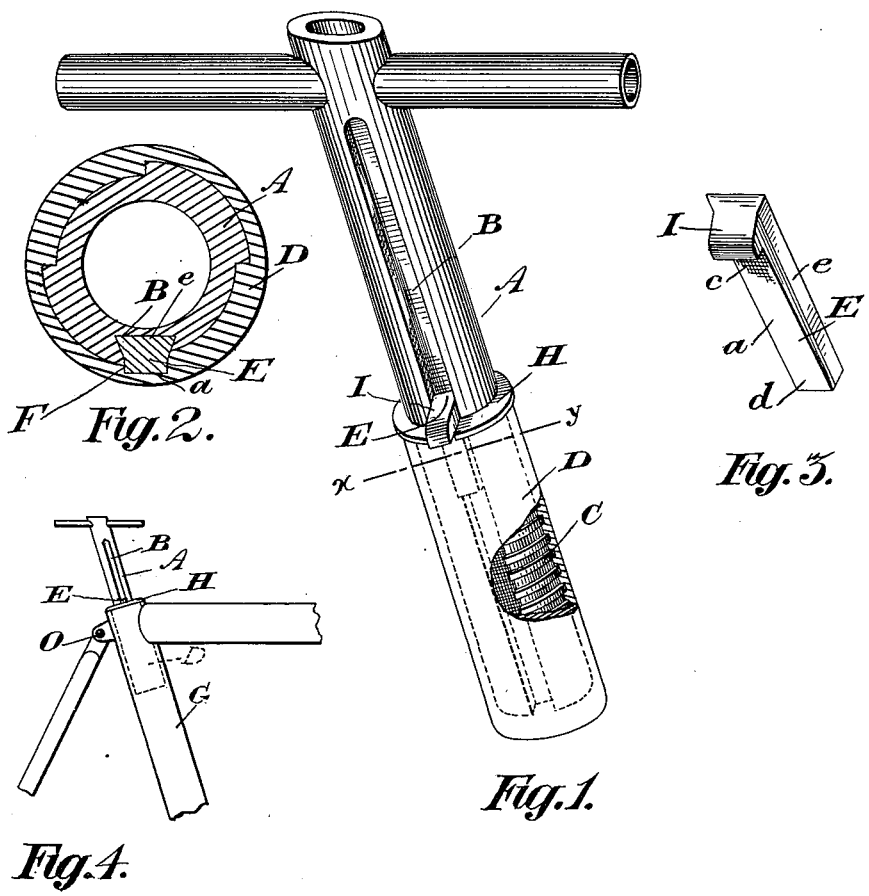

No. 653,410. Patented July 10, 1900.
J. H. CASH.
BICYCLE SEAT POST.
(Application filed Aug. 24, 1899.)

(No Model.)

Witnesses.
L. C. Reynolds
B. Gase

Inventor.
James Henry Cash
by
Egerton R. Case
Atty.

UNITED STATES PATENT OFFICE.

JAMES HENRY CASH, OF TORONTO, CANADA, ASSIGNOR TO JAMES BREWER RITTENHOUSE, OF SAME PLACE.

BICYCLE SEAT-POST.

SPECIFICATION forming part of Letters Patent No. 653,410, dated July 10, 1900.

Application filed August 24, 1899. Serial No. 728,299. (No model.)

*To all whom it may concern:*

Be it known that I, JAMES HENRY CASH, a citizen of the United States of America, residing at Toronto, in the county of York, Province of Ontario, Canada, have invented certain new and useful Improvements in Bicycle Seat-Posts, of which the following is a specification.

My invention relates to improvements in bicycle seat-posts; and the object of my invention is to provide a bicycle seat-post which will permit of the bicycle-saddle being quickly adjusted to the desired height; and it consists, essentially, of a longitudinally-slotted member which is designed to screw into an internally-threaded sleeve and a key for locking the said longitudinally-slotted member to the sleeve, as hereinafter more particularly explained.

Figure 1 is a perspective view of my seat-post, parts being broken away to show the construction thereof. Fig. 2 is an enlarged section through the seat-post on the line $xy$, Fig. 1. Fig. 3 is an enlarged perspective view of the key. Fig. 4 is a side view of part of a bicycle-frame, showing my seat-post held therein.

In the drawings like letters of reference indicate corresponding parts in each figure.

The seat-post A is provided with a longitudinal dovetailed groove B, which extends from the bottom thereof up to any desired height. The lower threaded portion C of the seat-post A screws into the internally-threaded sleeve D. In the inner surface of the sleeve D, commencing at its upper end and extending downwardly a little beyond the length of the key E, is a square slot F, (see Fig. 2,) into which fits the side $a$ of the key E. On reference to Fig. 4 it will be seen that the sleeve D is placed in the upward reach G and is prevented from falling down too far by its flange H. Immediately the said sleeve is placed in position the nut O is tightened and, pinching the upper portions of the upward reach G together, firmly holds the sleeve D in place. The seat-post is then screwed into the sleeve D and adjusted to the required position.

The side $e$ of the key E is of the same shape as the dovetailed groove B and fits snugly said groove. When the dovetailed groove B is brought into alinement with the slot F, the key E (which has been inserted from the bottom of the dovetailed groove B and moved up near the top thereof) is moved down, and its side $a$ engaging with the slot F locks the seat-post A securely in place. As the key E is tapered from $c$ to $d$, it will be understood that when it is pushed down into position (see Fig. 1) it forces the parts together and prevents rattling.

The head I of the key E extends beyond the flange H, so that the said key can be easily pulled upwardly when desired.

From this specification it will be seen that my seat-post is of simple construction and quickly and easily adjustable.

What I claim as my invention is—

In an adjustable but non-moving tubular seat-post for bicycles the combination of the tubular post, longitudinal dovetailed groove therein, lower threaded integral portion of said post, the internally-threaded, and rigidly-held sleeve, the key, having the dovetailed portion $e$ thereof movably held in the said dovetailed groove and the tapered rectangular side $a$ of said key designed to engage with the locking-slot in said sleeve when the post is adjusted, and thus lock said post in position, substantially as set forth and for the purpose specified.

In testimony whereof I have signed my name to this specification in the presence of two subscribing witnesses.

JAMES HENRY CASH.

Witnesses:
EGERTON R. CASE,
L. C. REYNOLDS.